Patented Jan. 22, 1929.

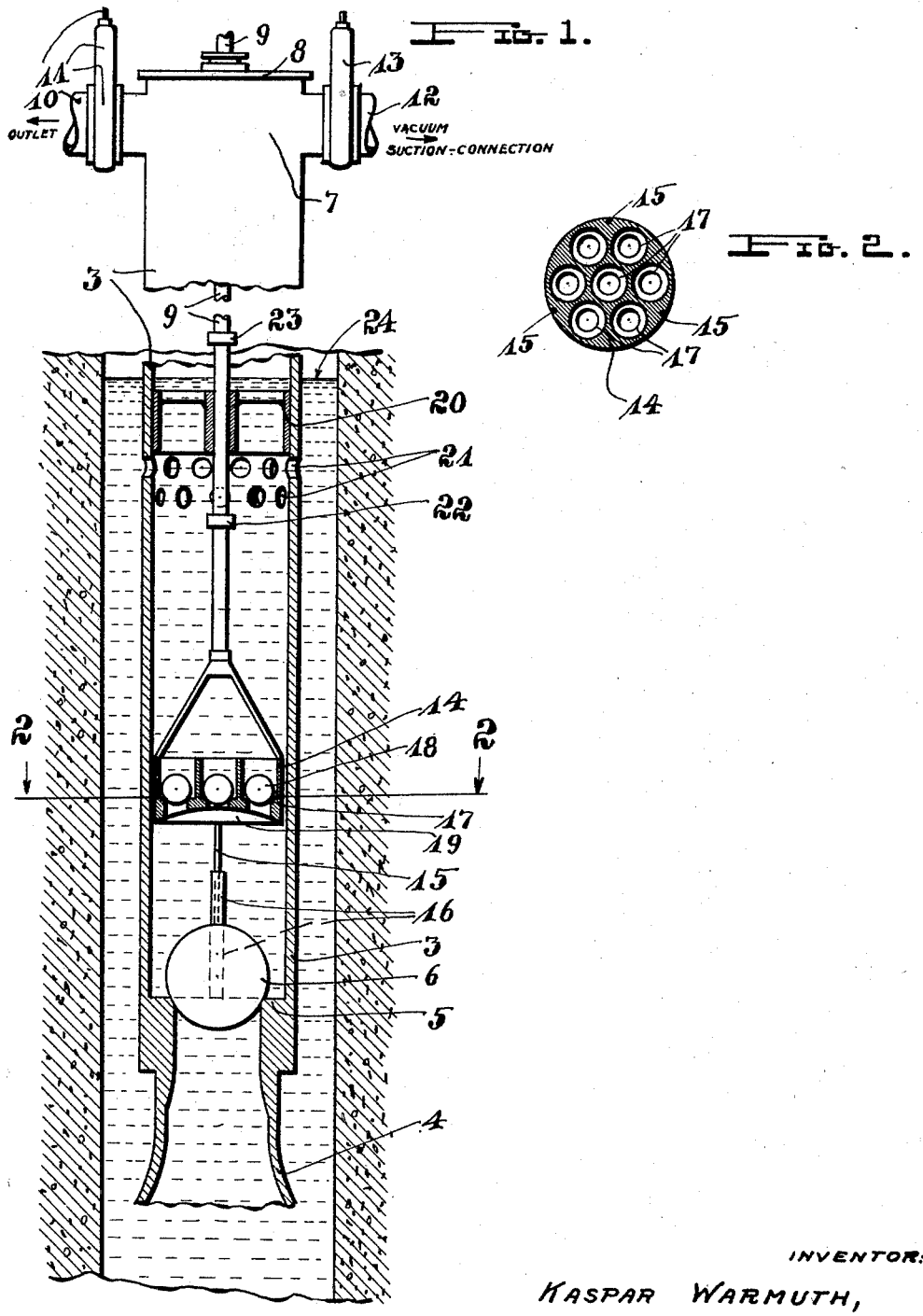

1,699,726

UNITED STATES PATENT OFFICE.

KASPER WARMUTH, OF SAN FERNANDO, CALIFORNIA.

WELL PUMP.

Application filed December 1, 1926. Serial No. 151,956.

This invention relates to devices used for drawing liquids from a lower to a higher level, and more particularly for drawing liquids out of wells.

One of the objects of this invention is to provide a pump with a vacuum connection to co-operate with a piston mechanism in the pump.

Another object is to provide a shiftable gate within the pump-housing operative by the piston-rod for opening the section control above the piston to allow a drawing of liquids by vacuum over the head of the piston through the pump-housing.

Another object is to provide a piston spaced within the pump-housing, so as to eliminate friction between the piston and the housing, the piston having a plurality of valves, each of greater area than the area of the space between the piston and the pump-housing.

Another object is to provide guides for the piston, spaced and distinct from the pump-housing, by which the piston is maintained in a central position, spaced within the pump-housing.

Other objects will appear from the following description and appended claims as well as from the accompanying drawing, in which—

Fig. 1 is a fragmentary vertical midsectional view of a pump with a checked valve within the lower end of the pump, and a plurality of valves within the piston, and other features embodying this invention.

Fig. 2 is a cross-section of the piston on line 2—2 of Fig. 1.

The pump casing or housing 3 is provided with a bell-shaped lower end 4 and a shouldered offset 5 forming a valve seat. The valve 6 is disposed within the pump casing seated on the valve seat 5. The upper end 7 of the casing is closed as indicated at 8, having proper provisions through which the piston-rod 9 is shiftably disposed. An outlet 10 is provided near the upper end of the pump casing, controllable by a valve 11. A second connection 12 near the upper end of the pump casing serves to allow a drawing of liquids from the pump casing by vacuum through separate pumps, not shown in the drawing. This connection 12 is controlled by a valve 13.

A piston 14 is disposed shiftably within the pump casing 3, being made distinctly smaller than the inside of the casing to leave a space between the casing and the piston in order to eliminate friction between the piston and the casing. The piston is provided with guide members 15, shiftable within tubular members 16, by which the piston is properly guided and concentrically spaced within the casing. The guiding members 15 are provided on the piston 14 while the tubular members 16 are provided on the pump casing. A plurality of valve seats 17 are embodied in the piston structure for the valves 18. Each of the valves 18 is designed to have a greater capacity than the area of the space between the piston and the pump casing, assuring a pumping at all times as long as a single one of the plurality of valves is in operative condition.

This last-named feature is of great importance in well-pumping, inasmuch as it tends to provide time for the other valves to clear and free themselvs of any sand or other matter, as long as one of the valves is properly pumping. The piston is preferably provided with a concaved bottom, as indicated at 19 to force liquids centrally on the downward stroke of the piston.

A cylindrical gate or controlling means 20 is disposed within the pump casing in a position to control the perforations 21 in the pump casing above the piston. The piston-rod 19 is shiftable through this controlling member 20 and is provided with stop and actuating portions 22 and 23 below and above the controlling member 20, by which the controlling member may be shifted within the pump casing for controlling the passage through the casing perforations 21.

When the piston is operated, the piston-rod is first moved to bring the stop or actuating portions 23 to bear on the controlling member 20, and the piston and piston-rod is moved downwardly to such an extent to bring the controlling member 20 into a position to close or cover the perforations 21. When the controlling member 20 has been shifted to this closing position, the pump can only draw through the lower end 4 of the casing by means of the valve 6 in the casing and the several valves 18 in the piston.

Having the piston designed of a size smaller than the inside of the pump casing, so as to eliminate undue friction, a comparatively rapid up and down movement of the piston can be arranged without any material wear between the piston and the pump casing. This feature is of advantage over common piston pumps for well-pumping.

The combination of piston and vacuum pumping by means of the controlling member 20 helps to fill the pump casing quickly up to the top, and by starting the vacuum pump at the proper moment and then opening the controlling member 20 and at the same time closing the valve 11, liquids may be drawn through the pump casing over the head of the piston through the perforations 21 by any vacuum pump, such as centrifugal or other rotary pump.

Having thus described my invention, I claim:

1. In a pump, a casing, a valve in the lower end of the casing, a piston shiftably disposed in the casing above said valve, a casing being closed at the top end, a connection for drawing matter by outside suction means from and through the pump casing, a second connection for discharging matter from the casing by means of the piston and passages in the pump at a point above the piston of said piston control by which matter may be drawn by outside suction means over the head of said piston through the pump.

2. In a pump, a pump casing, a piston for drawing matter through the pump casing, a connection by which outside suction means can be connected to the pump casing, and a control within the pump casing at a point above said piston to allow a drawing of matter by outside suction means from said connection over the head of said piston through the pump casing.

3. In a pump, a casing, a valve in the lower end of the casing, a piston shiftably disposed in the casing above said valve, passages in the casing above a working position of the piston, the said casing being closed at the upper end and having connections to discharge matter from the pump by the action of the piston and for connecting outside suction means by which matter can be drawn through the casing over the head of the piston and without piston action through said passages, and controlling means for the passages shiftable within the casing.

4. In a pump, a casing, checking means in the lower end of the casing, a piston shiftable in the casing above said checking means having a piston rod extending to the upper end of the casing for operating the piston, passages in the casing above the working position of the piston, the said casing being closed at the upper end and having connections to discharge matter from the pump by the action of the piston and for connecting outside suction means by which matter can be drawn through the casing over the head of the piston and without piston action through said passages, and controlling means for the passages operative by the piston rod.

5. In a pump, a casing, checking means in the lower end of the casing, a piston shiftable in the casing above said checking means having a piston rod extending to the upper end of the casing for operating the piston, passages in the casing above the working position of the piston, controlling means for the passages, the said casing being closed at the upper end and having connections to discharge matter from the pump by the action of the piston and for connecting outside suction means by which matter can be drawn through the casing over the head of the piston and without piston action through said passages, and means on the piston rod for shifting the controlling means in relation to said passages.

In testimony that I claim the foregoing as my invention I have signed my name.

KASPAR WARMUTH.